Feb. 2, 1965    B. A. WIPLINGER    3,168,425
HOLLOW STRUCTURE AND METHOD OF MAKING IT
Filed Oct. 19, 1961    3 Sheets-Sheet 1
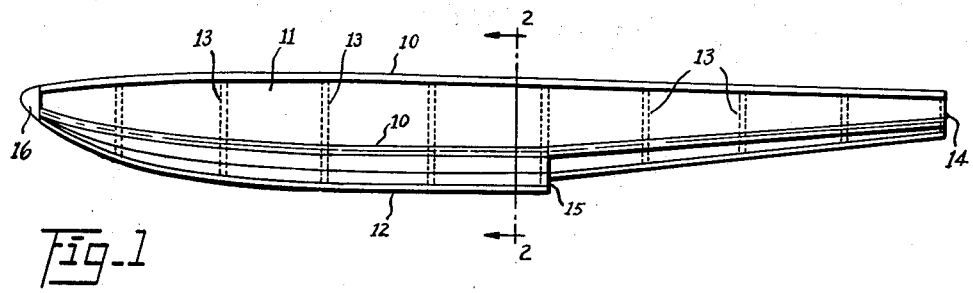
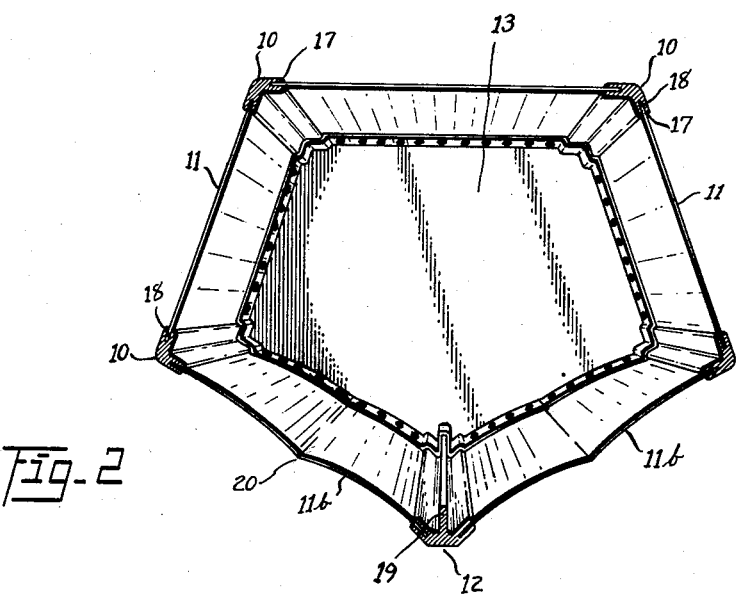
INVENTOR
BERNARD A. WIPLINGER
By Moore, White & Burd
Attorneys

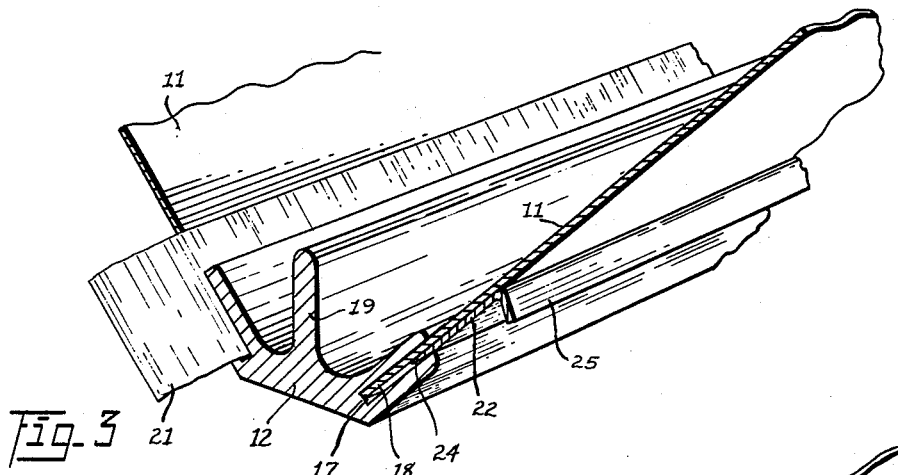
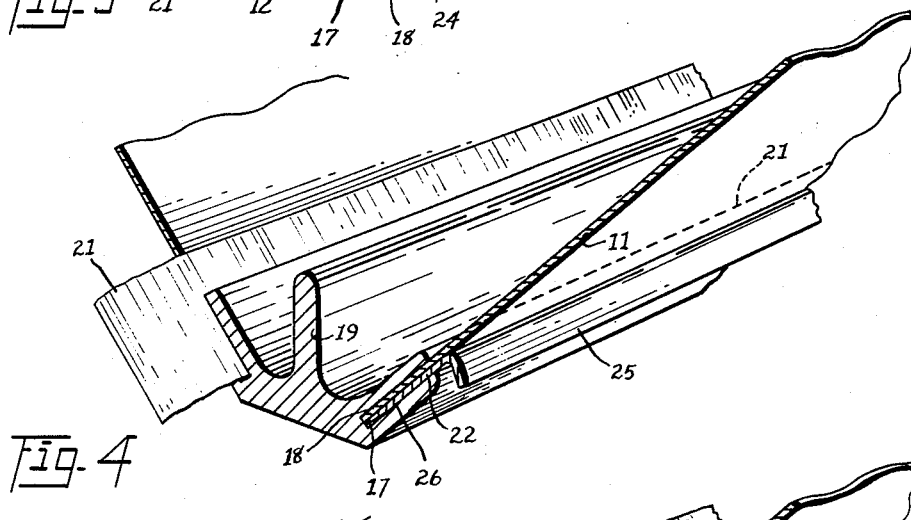
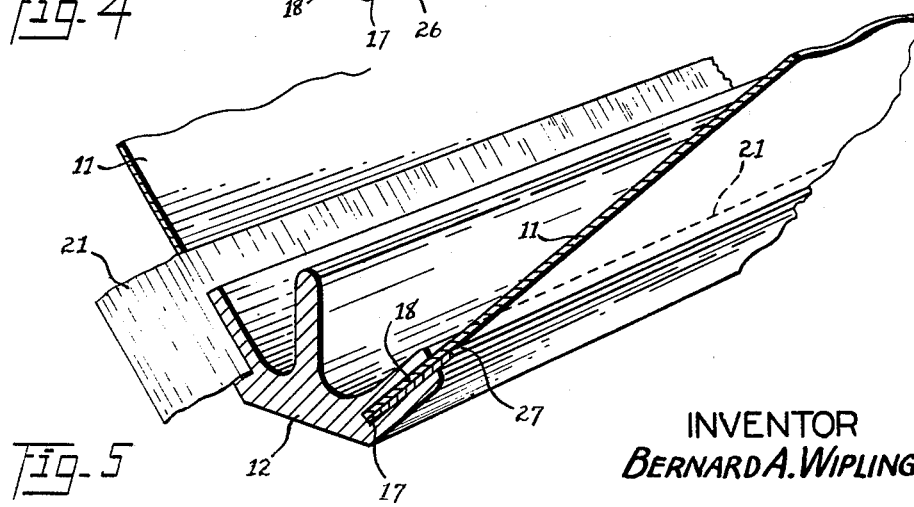

Feb. 2, 1965     B. A. WIPLINGER     3,168,425
HOLLOW STRUCTURE AND METHOD OF MAKING IT
Filed Oct. 19, 1961     3 Sheets-Sheet 3
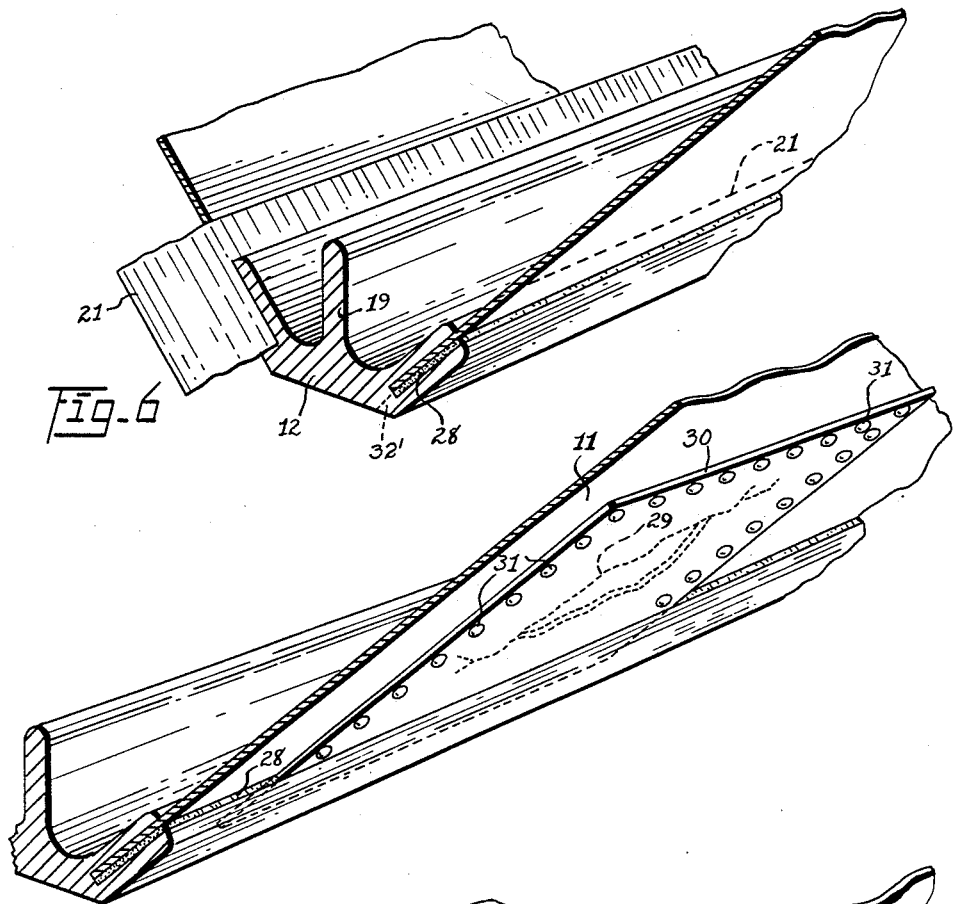
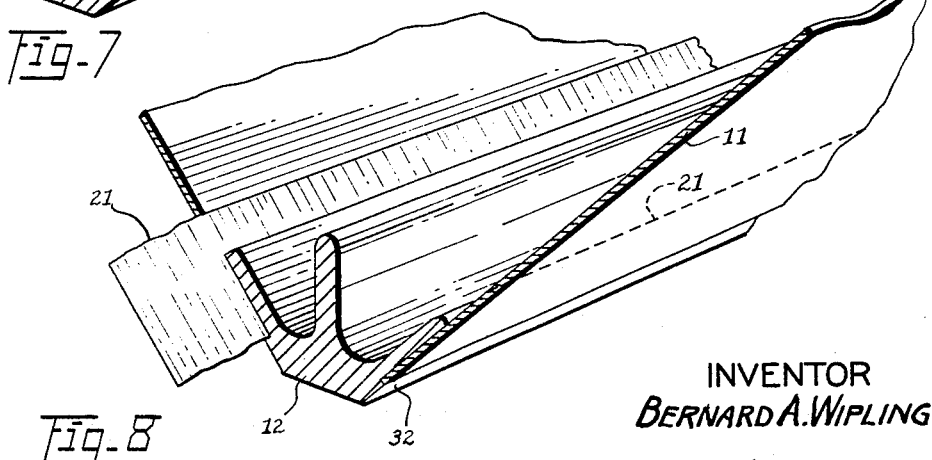
INVENTOR
BERNARD A. WIPLINGER
By Moore, Whitter Burd
Attorneys United States Patent Office 3,168,425
Patented Feb. 2, 1965

1

3,168,425
HOLLOW STRUCTURE AND METHOD OF
MAKING IT
Bernard A. Wiplinger, Rte. 10, South St. Paul, Minn.
Filed Oct. 19, 1961, Ser. No. 146,257
10 Claims. (Cl. 156—293)

This invention relates to hollow structures enclosing a space with sheets and interconnecting stringers and the method of securing the stringers and sheets together. Specifically, this invention is a hollow object formed of sheets and stringers in which the stringers have longitudinal slots therein into which the edges of the sheets are inserted and secured by a bonding agent applied under both heat and pressure by means of bonding film which may be a thin, preformed tape and special wedges driven into the slots with the edge of the sheet and the bonding material placed therein. Still another point of novelty resides in the means for repairing these hollow containers without the necessity of disassembling the units in order to make repairs. Another point of novelty in this invention lies in the ability to provide the exterior of the hollow object with a sleek, streamlined appearance after the sheets have been secured, if this is desirable.

In the past, hollow objects in the nature of aircraft flotation pontoons and the like which require substantial strength and lightness have been constructed from sheets of aluminum secured together by being riveted to a framework. Construction of such units is a time consuming and hence, expensive process. Furthermore, the repair of holes accidentally made in the sheet metal forming the major closure of the flotation equipment is a relatively difficult and time consuming process. These devices must be water tight, which only aggravates the problem, and testing of the finished structure also requires considerable time. As a result, each pontoon may cost as much as an expensive motor car, for example.

Furthermore, little progress has been made in the construction techniques employed making these devices over the years. Bonding agents that are adaptable to metal construction and are employed extensively in making some airplane components, for example ailerons and flaps as well as other aircraft structures, but there has been little progress made in attempting to use these bonding agents in making structures in the nature of pontoons. It is believed that the difficulty in applying clamping pressures to this particular type of object has been the main difficulty with them. In the case of ailerons and flaps, two reasonably flat surfaces are being pressed against a forming element, and the clamping problems are not severe. In the case of making an object that is largely hollow, such as a pontoon, however, the problem of applying clamping pressures between the stringers and the side portions is a major one. At any event, little or no progress has been made in the methods employed in manufacturing hollow articles of the general type which includes aircraft pontoons, and as a result, they remain enormously expensive.

Accordingly, it is a principal object of this invention to provide a novel hollow object and method of constructing it.

It is a further object of this invention to provide a novel aircraft pontoon structure.

2

Yet another object of this invention is to provide a pontoon structure that involves much less labor in its manufacture by reason of being bonded together rather than secured together by rivets or the like.

It is a still further object of this invention to provide a pontoon or other hollow object in which the exterior thereof may be made substantially smooth and streamlined.

Yet another object of this invention is to provide a hollow object formed of stringers and sheets with grooves in the former into which the edges of the ladder are fitted.

It is a still further object of this invention to make a grooved stringer and sheet hollow object structure in which wedges assist in securing the sheets in the grooves of the stringers.

A still further object of this invention is to provide a method of constructing hollow objects such as aircraft pontoons and the like which permits the application of force and heat to metal portions of the hollow object with a pressure and heat sensitive bonding agent therebetween.

A still further object of this invention is to provide a pontoon structure that is made water tight very readily.

A still further object of this invention is to make a pontoon that may be repaired with relative ease.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which:

FIGURE 1 is a side elevation of a pontoon made according to this invention with dotted lines illustrating hidden parts;

FIGURE 2 is an enlarged sectional view taken on the line 2—2 of FIGURE 1;

FIGURE 3 is an enlarged fragmentary perspective view of one stringer section and the sheet elements inserted in the slots thereof illustrating how the bonding agent and wedge are applied and drawn to the scale of FIGURE 2;

FIGURE 4 is a view similar to FIGURE 3 except that the pressure applying wedge has been fully inserted; the scale is that of FIGURE 2;

FIGURE 5 is a view similar to FIGURES 3 and 4 but disclosing a modified form of wedge; the scale is that of FIGURE 2;

FIGURE 6 is a view similar to FIGURES 3 and 4 with the wedge removed and caulking material substituted therefor; the scale used is that of FIGURE 2;

FIGURE 7 is a view still more fragmentary than FIGURES 3, 4, 5 and 6 showing more of one side plate and illustrating how a damaged plate may be repaired; broken lines illustrate hidden portions; the scale used is that of FIGURE 2; and FIGURE 8 is a view similar to those of FIGURES 3, 4 and 5 illustrating a modified finished construction for the device, again drawn to the scale of FIGURE 2.

Referring to the drawings and specifically to FIGURE 1, there is shown a pontoon constructed according to the invention in which there is a plurality of stringers 10 between which extend sheet metal portions 11. A stringer 12 at the bottom is specially constructed, as will be described in detail below, to serve as the keel stringer. At intervals along the length of the pontoon, bulkheads as at 13 may be used for the purpose of both strengthening the structure and rendering various portions of it water tight with respect to the balance thereof. This construction assures retention of flotation qualities even though one or two of the compartments may be punctured.

The rear end 14 of the pontoon is closed by conventional structure, the nature of which is not material to this invention. There is also structure at the step 15 which is not material to this invention and therefore not described in detail.

A suitable nose piece as at 16 closes the forward compartment of the pontoon and provides a finished appearance to that end. Here again, however, the nose piece may be of conventional construction and therefore not directly related to the invention described and claimed herein.

Conventional means (not shown) may be used to provide various other structures used in conjunction with this type of aircraft flotation gear as for example, rudders, retractable wheels and struts for securing the pontoon to an aircraft.

Turning now to the sectional view shown in FIGURE 2, the stringers 10 will be seen to be provided with slots as at 17 into which the edges 18 of the sheets 11 are inserted.

The keel stringer 12 has an upstanding member 19 formed therein as it is extruded to provide it with exceptional rigidity and thereby provide the entire structure with longitudinal rigidity.

The bottom sheets 11b enclosing the two lower portions of the pontoon may be formed to a central point as at 20 in order to provide desirable hydrodynamic characteristics. This formation of the elements 11b is not an essential part of the invention, however, and is not described in detail as to manner of formation and so forth.

In FIGURE 3, the details of how the panels 11 are secured in stringers are shown illustratively with respect to the keel stringer 12 and this securing means is the same for all the stringers. The means is a pressure and heat sensitive bonding agent 21 formed into long tapes which may be inserted with the end 18 of sheets 11 into the slots 17 of the stringer 12. Once the adhesive material and the plates are fully in the slot, a pressure creating wedge as at 22 is driven into the slot 17 beside the plate 18. Wedge 22 will be seen to be provided with a point 24 to aid in insertion into the slot and a hook-like portion 25 which serves a dual purpose of providing a surface to drive the wedge 22 into slot 17 and as a hook for later removing the wedge. Alternatively, the hook may be cut off after driving and the wedge left in place. If the wedge is to be left in the slot, however, a hookless wedge as shown in FIGURE 5 and discussed in connection with that figure is more practical.

In FIGURE 3, the bonding tape 21 extends beyond the cut-off ends of the sheet and stringer to illustrate clearly its character while at the right hand side of that drawing in the other slot wherein the wedge is shown, the tape of bonding material is hidden behind the sheet 11.

In FIGURE 4, the structure is identical to that shown in FIGURE 3 except that wedge 22 has been driven entirely into slot 17 thereby forcing the edge 18 of sheet 11 tight against the inner wall of slot 17 and thereby applying clamping pressure on the sheet bonding material 21. When all sheet edges have been secured, as by applying the wedges 22, the entire structure is placed in a heating device, and the temperature is raised to that required by the particular bonding material used.

The high point or pressure point of wedge 22 may be seen as at 26 to be about half the distance from the top to the bottom of the slot 17 when wedge 22 is fully driven into the slot. These wedges may be driven in in any suitable manner as by using a soft headed mallet or the like.

In FIGURE 5, the structure identical to that illustrated in FIGURES 3 and 4 therefore in general carries the same numbers as that figure. The wedge, however, is designated 27 since it is a modified form of the wedge 22 in which the hook 25 has been omitted. When the hook form of structure is used, it is intended that the wedge 22 will be removed after the adhesive has been cured properly by heating. In the case of the use of a wedge such as that shown at 27, however, the wedge is left in the slot and acts as part of the sealing and holding structure in a permanent fashion.

In FIGURE 6 there is shown the structure derived from that illustrated in FIGURES 3 and 4 after the wedge 22 has been removed. In its place is substituted a suitable caulking compound at 28. Any suitable zinc chromate paste caulking or the like may be used to give added assurance to the water tightness of the seal formed between the stringer 12 and the side element sheets 11.

In FIGURE 7 is illustrated a structure such as that shown in FIGURE 6 in which a panel has been damaged as shown by the broken lines 29 representing the hole that has been punctured in the side element 11 as by a hidden obstacle in a landing or take-off area. When a structure such as that shown in FIGURE 6 is employed, a relatively easy technique of repairing such damage is shown as being a plate 30 which has been inserted into slot 17 adjacent to the break 29. In order to do this, a portion of the zinc chromate paste 28 is removed which then permits the end of plate 30 to be inserted. If the plate 30 is of a material just slightly less thick than the wedge 22, it may be driven into the crack or slot 17 beside the original plate 11 by using a device similar to a glazer's point set on the top edge of plate 30. Thereafter, the plate and the original sheet 11 are both drilled and riveted with the application of suitable caulking between the drilled edges of the plate and sheet 11. A seal may be formed around the edges of plate 30 which are not inserted into slot 17. The portions inserted in the slot are secured by that fact. If the compartment is one for which an inspection opening is provided, ordinary rivets may be used to rivet the edge of plate 30 around break 29. If, on the other hand, the compartment is a sealed one, so-called blind or explosive rivets may be used to secure the plates 30 tightly to sheet 11.

Such recognized repair procedure as drilling at the ends of any cracks extending from the break 29 should also be employed to prevent continued extension of the cracks as the result of concentrated stresses.

If there is any space in slot 17 not filled by the edge of plate 30, it may be caulked with zinc chromate paste as the entire slot 17 was previously filled.

In FIGURE 8 is seen a structure such as that illustrated in FIGURE 4 in which the wedge 25 has been removed and a cut made as at the broken line 32' in FIGURE 6 for the purpose of removing the excess portion of the extrusion 12 that is not used in bonding sheet 11 thereto. The cut 32' in FIGURE 6 removes the wall of the stringer slot engaged by the wedge and that portion of the slot that would be filled with caulk if not removed and leaves a smooth surface 32 in FIGURE 8 that is flush with the outer surface of sheet 11. This structure may be employed whenever great emphasis is placed on smoothness and lightness as opposed to durability, strength and ease of repair.

In assembling units after the teaching of this invention, the adhesive strip or bonding strip 21 is placed along the edge of the sheets 11 as they are inserted into the slot 17 of the stringer. Thereafter, the desired form of wedges are driven into the slot 17. The critical factor in the use of the wedges and slots for applying bonding pressures to the metal portions and bonding agent therebetween is a matter of having the wedge, sheet and bonding agent deflect the outer wall of the stringers while staying within the elastic limits of the material from which the stringers 10 and 12 are made. If the elastic limit of the material is exceeded, less than the maximum pressure will be applied. Staying within the elastic limits of the stringer material is particularly important when heat cured flowable bonding agents are used. As the bonding material flows, the stringer slot walls must spring inwardly to retain desirable bonding pressures. In this manner bonding pressures in excess of 125 pounds per square inch can be maintained even when the bonding material melts and flows.

There are many suitable bonding materials that are well known and which meet military specifications A-5090 and A-5090B. These two specifications require a sheer strength for the bond at 70° F. of 2800 pounds per square inch. The bonding agent may be merely pressure sensitive or pressure and heat sensitive. It may take the form of a film of liquid applied before assembling the parts or a preformed tape such as Minnesota Mining & Mfg. Co. bonding film AF-13.

The thickness of the wedge at its highest point in comparison to the thickness of sheet 11 should be such that with the bonding film in place, the wedge may be engaged sufficiently to make it difficult to extract it again by hand but not be inserted to any considerable depth into slot 17 while plate 18 and the bonding film are in place.

Hook 22 extends the entire length of the joint and is driven in by means of the soft head mallet. It may be extracted by using the mallet in a reverse manner on hook 25. Because the wedge runs the entire length of slot 17, it applies an even pressure throughout the length of the stringer and thereby creates an impressively strong joint. At the same time, it is clear that the wedge may be driven into the stringer in a much shorter time and with much less expenditure of effort than would be necessary to rivet a similar piece to the stringer along its length. Furthermore, since the pressure required for bonding is applied by the wedge and slot, there is no necessity to attempt to clamp sheets 11 to the stringers by external clamping means.

Furthermore, the bonding agent forms a continuous and water tight seal throughout the length of the slot. When a further sealing agent is used, as by applying the zinc chromate paste 28, a seal is formed that is unquestionably water tight without necessity for detailed checking. Thus, it is possible to make hollow objects of water tight construction at a substantially reduced cost as compared with the cost of producing such units when the stringers and covering sheets or skin are riveted together.

It is apparent that many modifications and variations of this invention as hereinbefore set forth may be made without departing from the spirit and scope thereof. The specific embodiments described are given by way of example only and the invention is limited only by the terms of the appended claims.

What is claimed:

1. A method of securing sheets to stringers comprising: providing stringers having longitudinal slots therein, said slots being wider than said sheets are thick, providing sheets, providing bonding material, placing the bonding material and one edge of one said sheet in one slot of one of said stringers, providing a wedge substantially coextensive with each stringer-sheet joint, driving said wedge into said slot between said sheet and one side of said one slot of said one of said stringers to apply pressure between said sheet and the other side of the same slot of said one of said stringers with said bonding material therebetween, said wedges, bonding material and sheet edges springing said stringers within their elastic limits, and heating said stringer, sheet, bonding material and wedge and repeating said steps for each sheet edge to be secured.

2. A method of clamping members to be bonded comprising: providing a member having a slot therein, providing an element having a portion that is thinner than said member slot is wide, providing bonding material, placing the bonding material and said element portion in the slot of said member, providing a wedge, driving said wedge substantially coextensive longitudinally with the proposed joint between said member and said element into said member slot between said sheet and one side of said slot to apply pressure between said element and member with said bonding material therebetween.

3. The method of claim 2 in which said element, member, wedge and bonding material are heated and driving said wedge into said member slot deflects said member having a slot within the elastic limits of the material from which said member having a slot is made.

4. The method of claim 3 in which the pressure created by the wedge is at least 125 pounds per square inch.

5. A method for forming a closed hollow object comprising: providing a plurality of stringers, said stringers having longitudinal slots therein, providing a plurality of sheets, the edges of said sheets lying in the same plane as adjacent portions of said sheets and being thinner than the slots in said stringers are wide, providing films of bonding material, inserting the edges of the sheets in the slots of said stringers in a one edge to one slot relationship with said films of bonding material between said sheets and one wall of the slots of said stringers, providing wedges substantially coextensive in length with said stringers, driving the wedges into said slots and in engagement with said sheets and one side of said slots to force the edges of said sheets toward the other side wall of the slots in said stringers with said films of bonding material therebetween, curing said bonding material, removing said wedges, and filling a portion of said slots previously occupied by said wedges with a caulking material.

6. A method of forming a closed hollow object comprising: providing a plurality of stringers, said stringers having longitudinal slots therein, providing a plurality of sheets, the edges of said sheets being thinner than the slots in said stringers are wide, providing bonding material, inserting the edges of the sheets in the slots of said stringers in a one edge to one slot relationship with said bonding material between said sheets and one wall of the slots of said stringers, providing wedges, driving the wedges into said slots to force the edges of said sheets toward said one wall of the slots in said stringers and curing said bonding material.

7. The method of claim 6 further characterized by removing said wedge after curing of said bonding material is complete, and cutting away the other wall of said stringer slot.

8. A method of securing a sheet to a stringer comprising: providing a stringer having a longitudinal slot therein, providing a sheet, said slot being wider than said sheet is thick, providing bonding material, placing the bonding material and an edge of said sheet in the slot of said stringer, providing a wedge of a length substantially equally to the length of the sheet-stringer joint, driving said wedge into said slot to press said sheet toward one side of the slot of said stringer with said bonding material therebetween, heating said stringer sheet, bonding material and wedge, and removing said wedge.

9. The method of claim 8 further characterized by providing a caulking material, and filling the portion of said slot previously containing said wedge with caulking material.

10. The method of claim 8 further characterized by cutting off the portion of said stringer previously providing the portion of said slot filled by said wedge.

References Cited by the Examiner

UNITED STATES PATENTS

| | | | |
|---|---|---|---|
| 157,399 | 12/74 | Holmes | 20—92 |
| 569,235 | 10/96 | Rockwell | 20—92 |
| 1,440,282 | 12/22 | Dornier | 114—66.5 XR |
| 1,656,412 | 1/28 | Barnhart | 114—66.5 |
| 1,723,307 | 8/29 | Sipe | 189—36 |
| 1,761,451 | 6/30 | Ohnstrand | 9—6 |
| 1,881,733 | 10/32 | Lewis | 20—91 |
| 2,151,334 | 3/39 | Rockefeller | 29—501 |
| 2,165,545 | 7/39 | Grant | 9—6 |
| 2,342,023 | 2/44 | Vidal et al. | 114—66.5 XR |
| 2,534,311 | 12/50 | Smith | 189—34 |
| 2,591,994 | 4/52 | Alexander | 29—501 |
| 2,877,877 | 3/59 | Davis | 189—85 |
| 3,093,847 | 6/63 | Strecker | 69—6 |

FOREIGN PATENTS

| | | |
|---|---|---|
| 140,127 | 3/20 | Great Britain. |
| 356,194 | 8/31 | Great Britain. |
| 366,565 | 2/32 | Great Britain. |
| 468,280 | 7/37 | Great Britain. |

EARL M. BERGERT, *Primary Examiner.*

EMILE PAUL, FERGUS S. MIDDLETON, *Examiners.*